(12) United States Patent
Hao et al.

(10) Patent No.: US 11,552,755 B2
(45) Date of Patent: Jan. 10, 2023

(54) METHOD AND APPARATUS FOR DETERMINING RESOURCE FOR REFERENCE SIGNAL, AND DEVICE

(71) Applicant: ZTE Corporation, Guangdong (CN)

(72) Inventors: Peng Hao, Guangdong (CN); Junfeng Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/460,854

(22) Filed: Jul. 2, 2019

(65) Prior Publication Data

US 2019/0327055 A1 Oct. 24, 2019

Related U.S. Application Data

(63) Continuation of application No. PCT/CN2017/118961, filed on Dec. 27, 2017.

(30) Foreign Application Priority Data

Jan. 6, 2017 (CN) .......................... 201710011415.2

(51) Int. Cl.
*H04L 5/00* (2006.01)
*H04W 72/04* (2009.01)

(52) U.S. Cl.
CPC .......... *H04L 5/0048* (2013.01); *H04L 5/0007* (2013.01); *H04W 72/044* (2013.01)

(58) Field of Classification Search
CPC ... H04L 5/0048; H04L 5/0007; H04L 5/0005; H04W 72/044
See application file for complete search history.

(56) References Cited

U.S. PATENT DOCUMENTS

| 2011/0090854 A1* | 4/2011 | Montojo | H04L 5/0023 370/329 |
| 2012/0287885 A1* | 11/2012 | Dai | H04W 72/044 370/329 |
| 2012/0327896 A1* | 12/2012 | Lee | H04W 72/044 370/330 |
| 2013/0286966 A1* | 10/2013 | Chung | H04W 72/0406 370/329 |
| 2013/0294368 A1 | 11/2013 | Bendlin et al. | |

(Continued)

FOREIGN PATENT DOCUMENTS

| CN | 101594336 A | 12/2009 |
| CN | 103220103 A | 7/2013 |

(Continued)

OTHER PUBLICATIONS

International Search Report and Written Opinion for International Appl. No. PCT/CN2017/118961, dated Mar. 16, 2018.

(Continued)

*Primary Examiner* — Ian N Moore
*Assistant Examiner* — Latresa A McCallum
(74) *Attorney, Agent, or Firm* — Foley & Lardner LLP

(57) ABSTRACT

A method for determining a resource for a reference signal includes: determining, according to positions of N channel resource units used by a physical channel, R channel resource units from the N channel resource units, where both R and N are integers and 0≤R<N; and sending or receiving reference signals in the R channel resource units.

4 Claims, 7 Drawing Sheets

(56) References Cited

U.S. PATENT DOCUMENTS

| | | | | |
|---|---|---|---|---|
| 2015/0229451 A1* | 8/2015 | Park | ................... | H04W 72/042 |
| | | | | 370/312 |
| 2016/0037491 A1 | 2/2016 | Hwang et al. | | |
| 2016/0192385 A1* | 6/2016 | Tooher | ............... | H04L 27/2611 |
| | | | | 370/336 |
| 2018/0367274 A1* | 12/2018 | Shi | ....................... | H04L 5/0023 |

FOREIGN PATENT DOCUMENTS

| | | |
|---|---|---|
| CN | 103270715 A | 8/2013 |
| CN | 103391624 A | 11/2013 |
| CN | 103944665 A | 7/2014 |
| CN | 104054313 A | 9/2014 |
| CN | 104937866 A | 9/2015 |
| EP | 2 840 825 A1 | 2/2015 |
| EP | 3 297 363 A1 | 3/2018 |
| WO | WO-2016/186052 A1 | 11/2016 |

OTHER PUBLICATIONS

Extended European Search Report for EP Appl. No. 17889941.5, dated Jul. 14, 2020 (10 pages).

LG Electronics, "Discussion on resource unit for control channel", 3GPP TSG RAN WG1 Meeting #87, R1-1611835, Nov. 14-18, 2016 (4 pages).

First EP Office Action on EP 17889941.5 dated May 31, 2021 (7 pages).

Second Office Action for CN Appl. No. 201710011415.2, dated Mar. 24, 2022 (with English translation, 9 pages).

\* cited by examiner (A) UE 1 and UE 2 use self-contained DMRSs (B) UE 1 using self-contained DMRSs. UE 2 being indicated to use DMRSs in the OS 1

METHOD AND APPARATUS FOR DETERMINING RESOURCE FOR REFERENCE SIGNAL, AND DEVICE

CROSS REFERENCE TO RELATED APPLICATIONS

This application claims the benefit of priority under 35 U.S.C. § 120 as a continuation of PCT Patent Application No. PCT/CN2017/118961 filed on Dec. 27, 2017, which claims priority to Chinese Patent Application No. 201710011415.2, filed on Jan. 6, 2017, the content of each of which is incorporated by reference herein in its entirety.

TECHNICAL FIELD

The present disclosure relates to wireless communications and, for example, to a method and apparatus for determining a resource for a reference signal, and a device.

BACKGROUND

In a fourth Generation of wireless mobile telecommunications technology (4G) Long-Term Evolution (LTE) system, a variety of commonly used downlink reference signals have been designed, such as a cell-specific reference signal (CRSs) and a terminal-specific demodulation reference signal (DMRS). The DMRS also has different classifications, such as a dedicated reference signal based on a port 5 for demodulating a physical downlink shared channel (PDSCH), a reference signal based on ports 7 to 14 for demodulating the PDSCH, and a reference signal based on ports 107 to 110 for demodulating an enhanced physical downlink control channel (ePDCCH).

A characteristic of the CRS is that a position of the CRS is fixed. Regardless of whether to transmit related data, the CRS exists in each physical resource block (PRB). The CRS belongs to the cell-specific reference signal, and is independent of a specific user equipment (UE) and the mapping of PRB data. If there is data to be transmitted, CRS resources may be mapped, data resources may be mapped, and the data mapping may avoid the position of the CRS. FIG. 1 shows a manner for sending an LTE CRS in the related art.

The DMRS for demodulating the PDSCH or the ePDCCH is independent of the specific UE. That is, the DMRS is sent in condition that the PDSCH or the ePDCCH exists, and the DMRS exists in the PRB of the PDSCH or the ePDCCH. FIG. 2 shows a manner for sending the DMRS in the LTE in the related art.

SUMMARY

A method and apparatus for determining a resource for a reference signal and a device are provided to solve the problem of excessive reference signal overhead.

A method for determining a resource for a reference signal includes:

determining, according to locations of N channel resource units used by a physical channel, R channel resource units from the N channel resource units, where both R and N are integers and 0≤R<N; and sending or receiving reference signals in the R channel resource units.

In one embodiment, the N channel resource units include F different frequency domain positions, and each of the frequency domain positions includes N(f) channel resource units, where the N(f) channel resource units include R(f) channel resource units for sending or receiving the reference signals, f=0, 1, ... and F−1, 0≤R(f)≤N(f), and the R channel resource units are composed of channel resource units for sending or receiving the reference signals in the F different frequency domain positions.

In one embodiment, R(f) is 0 or 1.

In one embodiment, in condition that R(f) is 0, the reference signals are sent or received in designated channel resource units in the same frequency domain positions as the frequency domain positions of the N(f) channel resource units, where the designated channel resource units do not belong to the N channel resource units.

In one embodiment, a physical channel resource region includes the N channel resource units and the designated channel resource units, and the designated channel resource units are located in the front time domain resource of the physical channel resource region.

In one embodiment, for the N(f) channel resource units in each of the frequency domain positions, the reference signals are sent or received in a channel resource unit having the front time domain position in the N(f) channel resource units.

In one embodiment, each of the channel resource units includes X orthogonal frequency division multiplexing (OFDM) symbols in a time domain, where X is a positive integer.

In one embodiment, X is 1 or 2.

In one embodiment, in condition that X is 2, a first OFDM symbol of each of the R channel resource units is configured for sending or receiving the reference signals.

In one embodiment, each of the channel resource units includes Y physical resource blocks in a frequency domain, where each of the physical resource blocks includes Z resource elements, and both Y and Z are integers.

In one embodiment, Y is 4 or 1, and Z is 12.

In one embodiment, each of physical resource blocks of each of the R channel resource units includes W resource units, and the W resource units in the each of the physical resource blocks are configured for sending or receiving the reference signals, where W is an integer.

In one embodiment, W is 2 or 3.

In one embodiment, before determining, according to positions of N channel resource units used by a physical channel, R channel resource units from the N channel resource units, the method further includes:

acquiring or otherwise determining the N channel resource units according to a time-first manner, where the time-first manner includes: within a region formed by multiple OFDM symbols, selecting channel resource units on different OFDM symbols first, and then selecting channel resource units in different frequency domain resources.

In one embodiment, the within a region formed by a plurality of OFDM symbols, selecting channel resource units on different OFDM symbols first, and then selecting channel resource units in different frequency domain resources includes:

in condition that P different frequency domain positions are within the region formed by the plurality of OFDM symbols, which are respectively a frequency domain position f1, a frequency domain position f2, ... and a frequency domain position fP, selecting Q1 channel resource units on different OFDM symbols in the frequency domain position f1 first, then selecting Q2 channel resource units on different OFDM symbols in the frequency domain position f2, and by that analogy finally selecting Qp channel resource units on different OFDM symbols in the frequency domain position fP, where $N=\Sigma_{n=1}^{n=P}Q_n$, Qn is an integer, n=1, 2, . . . and P, and P is an integer.

An apparatus for determining a resource for a reference signal includes:

a determination module, which is configured to determine, according to positions of N channel resource units used by a physical channel, R channel resource units from the N channel resource units, where both R and N are integers and 0≤R<N; and a communication module, which is configured to send or receive reference signals in the R channel resource units.

In one embodiment, the N channel resource units include F different frequency domain positions, and each of the frequency domain positions includes N(f) channel resource units, where the N(f) channel resource units include R(f) channel resource units for sending or receiving the reference signals, f=0, 1, . . . and F−1, 0≤R(f)<N(f), and the R channel resource units are composed of channel resource units for sending or receiving the reference signals in the F different frequency domain positions.

In one embodiment, R(f) is 0 or 1.

In one embodiment, in condition that R(f) is 0, the reference signals are sent or received in designated channel resource units in the same frequency domain positions as the frequency domain positions of the N(f) channel resource units, where the designated channel resource units do not belong to the N channel resource units.

In one embodiment, the designated channel resource units are located in the front time domain resource of a physical channel resource region, where the physical channel resource region at least includes the N channel resource units and the designated channel resource units.

In one embodiment, for the N(f) channel resource units in each of the frequency domain positions, the reference signals are sent or received in a channel resource unit having the front time domain position in the N(f) channel resource units.

In one embodiment, each of the channel resource units includes X orthogonal frequency division multiplexing (OFDM) symbols in a time domain, where X is a positive integer.

In one embodiment, X is 1 or 2.

In one embodiment, in condition that X is 2, a first OFDM symbol of each of the R channel resource units is configured for sending or receiving the reference signals.

In one embodiment, each of the channel resource units includes Y physical resource blocks in a frequency domain, where each of the physical resource blocks includes Z resource elements, and both Y and Z are integers.

In one embodiment, Y is 4 or 1, and Z is 12.

In one embodiment, each of physical resource blocks of each of the R channel resource units includes W resource units, and the W resource units in the each of the physical resource blocks are configured for sending or receiving the reference signals, where W is an integer.

In one embodiment, W is 2 or 3.

In one embodiment, the apparatus further includes:

an acquisition module, which is configured to acquire or otherwise determine the N channel resource units according to a time-first manner, where the time-first manner includes: within a region formed by a plurality of OFDM symbols, selecting channel resource units on different OFDM symbols first, and then selecting channel resource units in different frequency domain resources.

In one embodiment, the within a region formed by a plurality of OFDM symbols, selecting channel resource units on different OFDM symbols first, and then selecting channel resource units in different frequency domain resources includes:

in condition that P different frequency domain positions are within the region formed by the plurality of OFDM symbols, which are respectively a frequency domain position f1, a frequency domain position f2, . . . and a frequency domain position fP, selecting Q1 channel resource units on different OFDM symbols in the frequency domain position f1 first, then selecting Q2 channel resource units on different OFDM symbols in the frequency domain position f2, and by that analogy finally selecting Qp channel resource units on different OFDM symbols in the frequency domain position fP, where $N=\Sigma_{n=1}^{n=P}Q_n$, Qn is an integer, n=1, 2, . . . and P, and P is an integer.

A device includes:

a processor, which is configured to determine, according to positions of N channel resource units used by a physical channel, R channel resource units from the N channel resource units, where both R and N are integers and 0≤R<N; and a radio frequency module, which is configured to send or receive reference signals in the R channel resource units.

In one embodiment, the N channel resource units include F different frequency domain positions, and each of the frequency domain positions includes N(f) channel resource units, where the N(f) channel resource units include R(f) channel resource units for sending or receiving the reference signals, f=0, 1, . . . and F−1, 0≤R(f)≤N(f), and the R channel resource units are composed of channel resource units for sending or receiving the reference signals in the F different frequency domain positions.

In one embodiment, R(f) is 0 or 1.

In one embodiment, in condition that R(f) is 0, the reference signals are sent or received in designated channel resource units in the same frequency domain positions as the frequency domain positions of the N(f) channel resource units, where the designated channel resource units do not belong to the N channel resource units.

In one embodiment, the designated channel resource units are located in the front time domain resource of a physical channel resource region, where the physical channel resource region at least includes the N channel resource units and the designated channel resource units.

In one embodiment, for the N(f) channel resource units in each of the frequency domain positions, the reference signals are sent or received in a channel resource unit having the front time domain position in the N(f) channel resource units.

In one embodiment, each of the channel resource units includes X orthogonal frequency division multiplexing (OFDM) symbols in a time domain, where X is a positive integer.

In one embodiment, X is 1 or 2.

In one embodiment, in condition that X is 2, a first OFDM symbol of each of the R channel resource units is configured for sending or receiving the reference signals.

In one embodiment, each of the channel resource units includes Y physical resource blocks in a frequency domain, where each of the physical resource blocks includes Z resource elements, and both Y and Z are integers.

In one embodiment, Y is 4 or 1, and Z is 12.

In one embodiment, each of physical resource blocks of each of the R channel resource units includes W resource units, and the W resource units in the each of the physical resource blocks are configured for sending or receiving the reference signals, where W is an integer.

In one embodiment, W is 2 or 3.

In one embodiment, the processor is further configured to acquire or otherwise determine the N channel resource units according to a time-first manner, where the time-first manner includes: within a region formed by a plurality of OFDM symbols, selecting channel resource units on different OFDM symbols first, and then selecting channel resource units in different frequency domain resources.

In one embodiment, the within a region formed by a plurality of OFDM symbols, selecting channel resource units on different OFDM symbols first, and then selecting channel resource units in different frequency domain resources includes: in condition that P different frequency domain positions are within the region formed by the plurality of OFDM symbols, which are respectively a frequency domain position f1, a frequency domain position f2, . . . and a frequency domain position fP, selecting Q1 channel resource units on different OFDM symbols in the frequency domain position f1 first, then selecting Q2 channel resource units on different OFDM symbols in the frequency domain position f2, and by that analogy finally selecting Qp channel resource units on different OFDM symbols in the frequency domain position fP, where $N=\Sigma_{n=1}^{n=P} Q_n$, Qn is an integer, n=1, 2, . . . and P, and P is an integer.

A computer-readable storage medium is configured to store computer-executable instructions for executing the method described above.

An electronic device includes: at least one processor, and a memory which is in a communication connection with the at least one processor. Where the memory stores instructions executable by the at least one processor, which executes the instructions to execute the method described above.

DETAILED DESCRIPTION

The terms "first", "second" and the like in the description, claims and drawings of the present disclosure are used to distinguish between similar objects and are not necessarily used to describe a particular order or sequence.

A common characteristic of a cell-specific reference signal (CRSs) and a terminal-specific demodulation reference signal (DMRS) is that when a reference signal needs to exist, a corresponding reference signal is required to exist in a physical resource block (PRB). Since in the long-term evolution (LTE), multiple types of downlink reference signals co-exist in the same PRB, reference signal overhead is so excessive that the LTE transmission efficiency is reduced. This is also one of problems in the LTE which have not been solved.

In a design process of a new generation mobile communication system, the reference signal is also required to assist the demodulation of data or control information. In order to avoid excessive reference signal overhead in the LTE, it is necessary to find a way to reduce the reference signal overhead.

Figure 1:
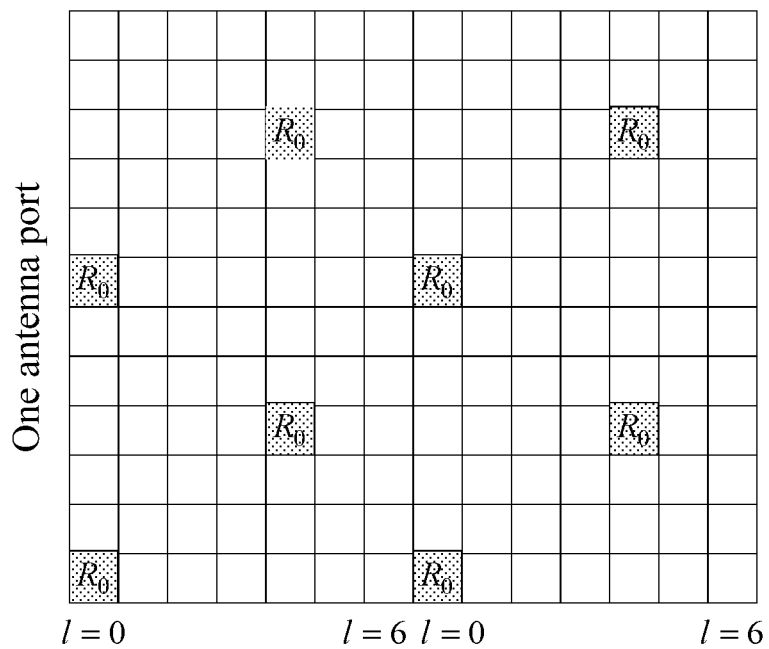
FIG. 1 is a schematic diagram illustrating a manner for sending an LTE CRS.
Figure 2:
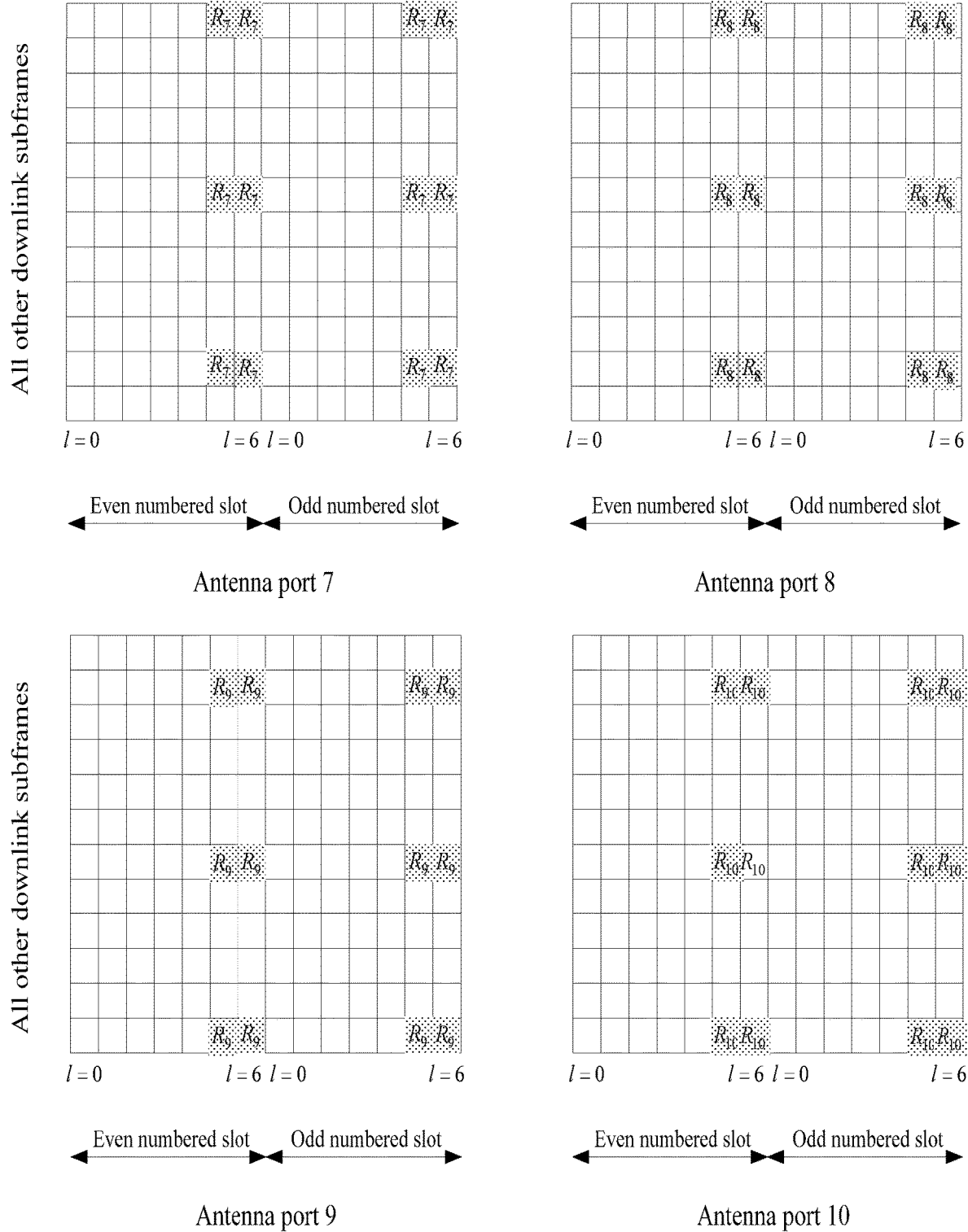
FIG. 2 is a schematic diagram illustrating a manner for sending a DMRS in an LTE.
Figure 3:
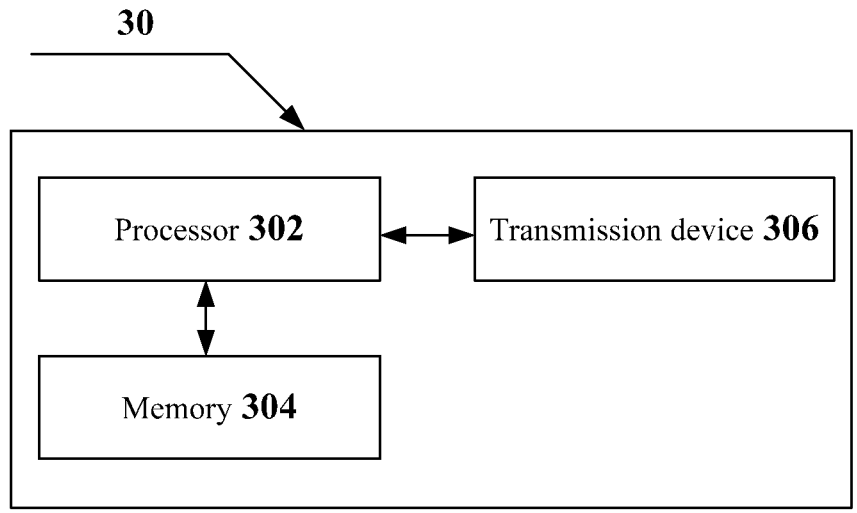
FIG. 3 is a block diagram showing hardware structures of a mobile terminal according to an embodiment of the present disclosure.

Method embodiments provided by following embodiments may be executed in a mobile terminal, a computer terminal or other similar computing devices. Taking the method embodiment executed in the mobile terminal as an example, FIG. 3 is a block diagram showing hardware structures of a mobile terminal according to an embodiment of the present disclosure. As shown in FIG. 3, a mobile terminal 30 may include one or more (only one is shown in FIG. 3) processors 302 (the processor 302 may include a processing device such as a microcontroller unit (MCU) or a programmable logic device such as a field programmable gate array (FPGA), a memory 304 configured to store data, and a transmission module 306 having a communication function. The structure shown in FIG. 3 is merely illustrative. The mobile terminal 30 may further include more or fewer components than the components shown in FIG. 3 or may have a configuration different from the configuration shown in FIG. 3.

The memory 304 may be configured to store software programs and modules of application software, such as program instructions or modules corresponding to a method for determining a resource for a reference signal in following embodiments. The processors 302 execute the software programs and modules stored in the memory 304 to perform functional applications and data processing, that is, to implement the method described above. The memory 304 may include a high-speed random access memory, and may further include a nonvolatile memory, such as one or more magnetic storage devices, flash memories or other nonvolatile solid-state memories. In some examples, the memory 304 may further include memories which are remotely disposed with respect to the processor 302 and these remote memories may be connected to the mobile terminal 30 via a network. Examples of the preceding network include the Internet, intranets, local area networks, mobile communication networks and combinations thereof.

The transmission device 306 is configured to receive or send data via a network.

The network described above may include a wireless network provided by a communication provider of the mobile terminal 30. In one example, the transmission device 306 includes a network interface controller (NIC), which may be connected to other network devices via a base station and thus be capable of communicating with the Internet. In one example, the transmission device 306 may be a radio frequency (RF) module, which is configured to communicate with the Internet in a wireless way.

Figure 4:
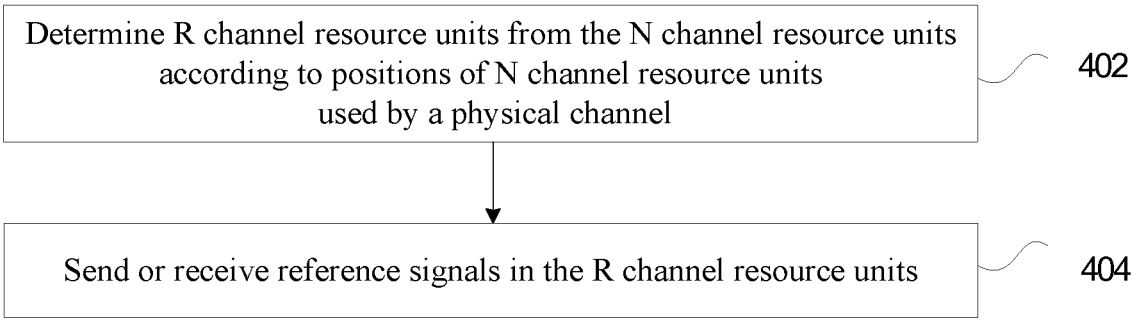
FIG. 4 is a flowchart illustrating a method for determining a resource for a reference signal according to an embodiment of the present disclosure.

One embodiment provides a method for determining a resource for a reference signal executed in the mobile terminal or the base station. FIG. 4 is a flowchart illustrating a method for determining a resource for a reference signal according to an embodiment of the present disclosure. As shown in FIG. 4, the method includes the step described below.

In step 402, R channel resource units are determined from N channel resource units according to positions of the N channel resource units used by a physical channel, where both R and N are integers and 0≤R<N.

In step 404, reference signals are sent or received in the R channel resource units.

Through the steps described above, reference signals are sent or received in the R channel resource units determined from the N channel resource units, where 0≤R<N (that is, the reference signals are sent or received in part of channel resource units used by a physical channel). When compared with the situation in the related art of the reference signals are sent or received in all channel resource units used by the physical channel, the issue of reference signal overhead can be reduced. Therefore, the problem in the related art of excessive reference signal overhead can be solved, which can improve the usage efficiency of system resources.

In one embodiment, the N channel resource units include F different frequency domain positions, and each of the frequency domain positions includes N(f) channel resource units, where the N(f) channel resource units include R(f) channel resource units for sending or receiving the reference signals, f=0, 1, ... and F−1, 0≤R(f)≤N(f), and the R channel resource units are composed of channel resource units for sending or receiving the reference signals in the F different frequency domain positions. That is, $R=\Sigma_{f=0}^{f=F-1} R(f)$.

In one embodiment, R(f) is 0 or 1. In condition that R(f) is 1, a self-contained reference signal manner is adopted, that is, channel resource units determined from the N channel resource units are configured for sending or receiving the reference signals.

In one embodiment, in condition that R(f) is 0, a non-self-contained manner is adopted, that is, the reference signals are sent or received in designated channel resource units in the same frequency domain positions as the frequency domain positions of the N(f) channel resource units, where the designated channel resource units do not belong to the N channel resource units.

In one embodiment, the designated channel resource units may be one channel resource unit, or may be multiple channel resource units. The designated channel resource units and the N channel resource units are multiplexed in a frequency domain, and are distinguished by a time domain.

In one embodiment, the designated channel resource units are located in the front time domain resource of a physical channel resource region, where the physical channel resource region includes the N channel resource units and the designated channel resource units.

In one embodiment, for the N(f) channel resource units in each of the frequency domain positions, the reference signals are sent or received in a channel resource unit having the front time domain position in the N(f) channel resource units. In the channel resource units with the same frequency domain positions, only one channel resource unit may be configured for sending or receiving the reference signal. The channel resource unit for sending or receiving the reference signal is a channel resource unit with the most-front time domain position in the channel resource units with the same frequency domain positions.

In one embodiment, each of the channel resource units includes X orthogonal frequency division multiplexing (OFDM) symbols in a time domain, where X is a positive integer.

In one embodiment, X is 1 or 2.

In one embodiment, in condition that X is 2, a first OFDM symbol of each of the R channel resource units is configured to send or receive the reference signals.

In one embodiment, each of the channel resource units includes Y physical resource blocks in a frequency domain, where each of the physical resource blocks includes Z resource elements, and both Y and Z are integers.

In one embodiment, Y may be 4 or 1, and Z may be 12.

In one embodiment, each of physical resource blocks of each of the R channel resource units includes W resource units, and the W resource units in the each of the physical resource blocks are configured for sending or receiving the reference signals, where W is an integer.

In one embodiment, W is 2 or 3.

In one embodiment, before the step 402 described above, the method may further include acquiring or otherwise determining the N channel resource units according to a time-first manner. The time-first manner includes within a region formed by one or more OFDM symbols (OSs), selecting channel resource units on different OFDM symbols first, and then selecting channel resource units in different frequency domain resources.

In one embodiment, the step of within a region formed by multiple OFDM symbols, selecting channel resource units on different OFDM symbols first, and then selecting channel resource units in different frequency domain resources includes: in condition that P different frequency domain positions are within the region formed by the multiple OFDM symbols, which are respectively a frequency domain position f1, a frequency domain position f2, ... and a frequency domain position fP, selecting Q1 channel resource units on different OFDM symbols in the frequency domain position f1 first, then selecting Q2 channel resource units on different OFDM symbols in the frequency domain position f2, and by that analogy finally selecting Qp channel resource units on different OFDM symbols in the frequency domain position fP, where $N=\Sigma_{n=1}^{n=P} Q_n$, Qn is an integer, n=1, 2, ... and P, and P is an integer.

Optionally, the above steps may be executed by a base station, or may be executed by a terminal.

The method in embodiments described above may be implemented by software plus a general-purpose hardware platform, or may be implemented by hardware. The solution provided by the present disclosure may be embodied in the form of a software product. The computer software product is stored in a non-transient storage medium (such as a read-only memory (ROM), a random-access memory (RAM), a magnetic disk or an optical disk) and the storage medium includes one or more instructions for enabling a terminal device (which may be a mobile phone, a computer, a server, or a network device) to execute part or all of steps of the method described in the embodiments of the present disclosure. The foregoing storage medium may be a non-transient storage medium, such as a USB disk, a mobile hard disk, an ROM, an RAM, a magnetic disk, an optical disk or another medium that can store program codes, or may be a transient storage medium.

One embodiment provides an apparatus for determining a resource for a reference signal for implementing any of embodiments described above. As used below, the term "module" may be at least one of software, hardware and a combination thereof capable of implementing predetermined functions. The apparatus described below in the embodiment may be implemented by software, hardware or a combination of software and hardware.

Figure 5:
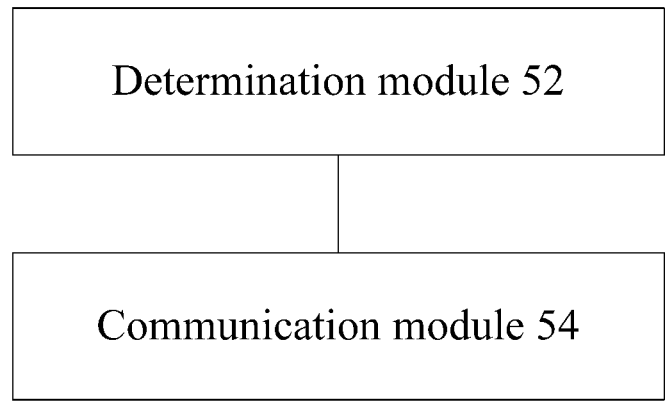
FIG. 5 is a block diagram of an apparatus for determining a resource for a reference signal according to an embodiment of the present disclosure.

FIG. 5 is a block diagram of an apparatus for determining a resource for a reference signal according to an embodiment of the present disclosure. As shown in FIG. 5, the apparatus includes a determination module 52 and a communication module 54 (also known as a communication circuit).

The determination module 52 is configured to determine, according to positions of N channel resource units used by a physical channel, R channel resource units from the N channel resource units, where both R and N are integers and $0 \leq R < N$.

The communication module 54 is connected to the determination module 52 and is configured to send or receive reference signals in the R channel resource units.

Through the apparatus described above, since reference signals are sent or received in R channel resource units determined from N channel resource units, where $0 \leq R < N$ (that is, the reference signals are sent or received in part of channel resource units used by a physical channel), compared with the situation in the related art of the reference signals are sent or received in all channel resource units used by the physical channel, reference signal overhead is reduced, thereby solving the problem in the related art of excessive reference signal overhead, and improving the usage efficiency of system resources.

In one embodiment, the N channel resource units include F different frequency domain positions, and each of the frequency domain positions includes N(f) channel resource units, where the N(f) channel resource units include R(f) channel resource units for sending or receiving the reference signals, $f=0, 1, \ldots$ and $F-1$, $0 \leq R(f) \leq N(f)$, and the R channel resource units are composed of channel resource units for sending or receiving the reference signals in the F different frequency domain positions. That is, $R=\sum_{f=0}^{f=F-1} R(f)$.

In one embodiment, R(f) is 0 or 1.

In one embodiment, in condition that R(f) is 1, a self-contained reference signal manner is adopted, that is, channel resource units determined from the N channel resource units are configured for sending or receiving the reference signals.

In one embodiment, in condition that R(f) is 0, a non-self-contained manner is adopted, that is, the reference signals are sent or received in designated channel resource units in the same frequency domain positions as the frequency domain positions of the N(f) channel resource units, where the designated channel resource units do not belong to the N channel resource units.

In one embodiment, the designated channel resource units may be one channel resource unit, or may be multiple channel resource units. The designated channel resource units and the N channel resource units are multiplexed in a frequency domain, and are distinguished by a time domain.

In one embodiment, the designated channel resource units are located in a front time domain resource of a physical channel resource region, where the physical channel resource region at least includes the N channel resource units and the designated channel resource units.

In one embodiment, for the N(f) channel resource units in each of the frequency domain positions, the reference signals are sent or received in a channel resource unit having the front time domain position in the N(f) channel resource units. In the channel resource units with the same frequency domain positions, only one channel resource unit may be configured for sending or receiving the reference signal. The channel resource unit for sending or receiving the reference signal is a channel resource unit with the most-front time domain position in the channel resource units with the same frequency domain positions.

In one embodiment, each of the channel resource units includes X orthogonal frequency division multiplexing (OFDM) symbols in a time domain, where X is a positive integer.

In one embodiment, X is 1 or 2.

In one embodiment, in condition that X is 2, a first OFDM symbol of each of the R channel resource units is configured to send or receive the reference signals.

In one embodiment, each of the channel resource units includes Y physical resource blocks in a frequency domain, where each of the physical resource blocks includes Z resource elements, and both Y and Z are integers.

In one embodiment, Y is 4 or 1, and Z is 12.

In one embodiment, each of physical resource blocks of each of the R channel resource units includes W resource units, and the W resource units in the each of the physical resource blocks are configured for sending or receiving the reference signals, where W is an integer.

In one embodiment, W is 2 or 3.

In one embodiment, the apparatus may further include an acquisition module. The acquisition module is connected to the determination module 52 and is configured to acquire or otherwise determine the N channel resource units according to a time-first manner. The time-first manner includes: within a region formed by multiple OFDM symbols, selecting channel resource units on different OFDM symbols first, and then selecting channel resource units in different frequency domain resources.

In one embodiment, the step of within a region formed by multiple OFDM symbols, selecting channel resource units on different OFDM symbols first, and then selecting channel resource units in different frequency domain resources includes: in condition that P different frequency domain positions are within the region formed by the multiple OFDM symbols, which are respectively f1, f2, ... and fP, selecting Q1 channel resource units on different OFDM symbols in the frequency domain position f1 first, then selecting Q2 channel resource units on different OFDM symbols in the frequency domain position f2, and by that analogy finally selecting Qp channel resource units on different OFDM symbols in the frequency domain position fP, where $N=\sum_{n=1}^{n=P} Q_n$, Qn is an integer, $n=1, 2, \ldots$ and P, and P is an integer.

The apparatus may be located in a base station, or may be located in a terminal.

In one embodiment, the various modules described above may be implemented by software or hardware. In the implementation by hardware, the various modules are disposed in the same processor or respectively in processors in any combination.

Figure 6:
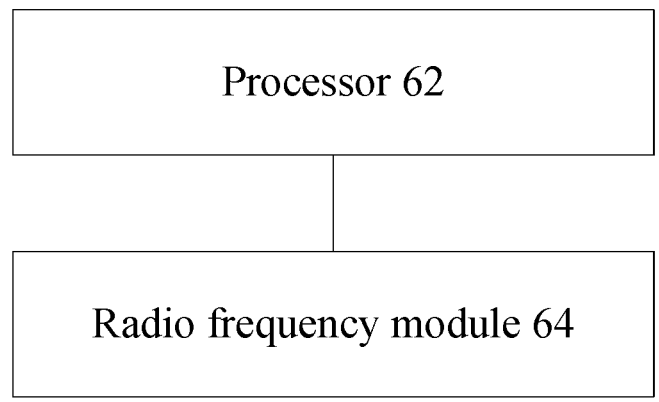
FIG. 6 is a structural diagram of a device according to an embodiment of the present disclosure.

One embodiment provides a device. FIG. 6 is a structural diagram of a device according to an embodiment of the present disclosure. As shown in FIG. 6, the device includes a processor 62 and a radio frequency module 64 (also known as a radio frequency circuit).

The processor 62 is configured to determine, according to positions of N channel resource units used by a physical channel, R channel resource units from the N channel resource units, where both R and N are integers and $0 \leq R < N$.

The radio frequency module 64 is connected to the processor 62 and is configured to send or receive reference signals in the R channel resource units.

Through the device described above, since reference signals are sent or received in R channel resource units determined from N channel resource units, where 0≤R<N (that is, the reference signals are sent or received in part of channel resource units used by a physical channel), compared with the situation in the related art of the reference signals are sent or received in all channel resource units used by the physical channel, reference signal overhead is reduced, thereby solving the problem in the related art of excessive reference signal overhead, and improving the usage efficiency of system resources.

In one embodiment, the N channel resource units include F different frequency domain positions, and each of the frequency domain positions includes N(f) channel resource units, where the N(f) channel resource units include R(f) channel resource units for sending or receiving the reference signals, f=0, 1, ... and F−1, 0≤R(f)≤N(f), and the R channel resource units are composed of channel resource units for sending or receiving the reference signals in the F different frequency domain positions. That is, $R=\Sigma_{f=0}^{f=F-1}R(f)$.

In one embodiment, R(f) is 0 or 1. In condition that R(f) is 1, a self-contained reference signal manner is adopted, that is, channel resource units determined from the N channel resource units are configured for sending or receiving the reference signals.

In one embodiment, in condition that R(f) is 0, a non-self-contained manner is adopted, that is, the reference signals are sent or received in designated channel resource units in the same frequency domain positions as the frequency domain positions of the N(f) channel resource units, where the designated channel resource units do not belong to the N channel resource units.

In one embodiment, the designated channel resource units may be one channel resource unit, or may be multiple channel resource units. The designated channel resource units and the N channel resource units are multiplexed in a frequency domain, and are distinguished by a time domain.

In one embodiment, the designated channel resource units are located in a front time domain resource of a physical channel resource region, where the physical channel resource region at least includes the N channel resource units and the designated channel resource units.

In one embodiment, for the N(f) channel resource units in each of the frequency domain positions, the reference signals are sent or received in a channel resource unit having the front time domain position in the N(f) channel resource units. In the channel resource units with the same frequency domain positions, only one channel resource unit may be configured for sending or receiving the reference signal. The channel resource unit for sending or receiving the reference signal is a channel resource unit with the most-front time domain position in the channel resource units with the same frequency domain positions.

In one embodiment, each of the channel resource units includes X orthogonal frequency division multiplexing (OFDM) symbols in a time domain, where X is a positive integer.

In one embodiment, X is 1 or 2.

In one embodiment, in condition that X is 2, a first OFDM symbol of each of the R channel resource units is configured to send or receive the reference signals.

In one embodiment, each of the channel resource units includes Y physical resource blocks in a frequency domain, where each of the physical resource blocks includes Z resource elements, and both Y and Z are integers.

In one embodiment, Y is 4 or 1, and Z is 12.

In one embodiment, each of physical resource blocks of each of the R channel resource units includes W resource units, and the W resource units in the each of the physical resource blocks are configured for sending or receiving the reference signals, where W is an integer.

In one embodiment, W is 2 or 3.

In one embodiment, the processor 62 is further configured to acquire or otherwise determine the N channel resource units according to a time-first manner. The time-first manner includes within a region formed by multiple OFDM symbols, selecting channel resource units on different OFDM symbols first, and then selecting channel resource units in different frequency domain resources.

In one embodiment, the step of within a region formed by multiple OFDM symbols, selecting channel resource units on different OFDM symbols first, and then selecting channel resource units in different frequency domain resources includes in condition that P different frequency domain positions are within the region formed by the multiple OFDM symbols, which are respectively a frequency domain position f1, a frequency domain position f2, . . . and a frequency domain position fP, selecting Q1 channel resource units on different OFDM symbols in the frequency domain position f1 first, then selecting Q2 channel resource units on different OFDM symbols in the frequency domain position f2, and by that analogy finally selecting Qp channel resource units on different OFDM symbols in the frequency domain position fP, where $N=\Sigma_{n=1}^{n=P}Q_n$, Qn is an integer, n=1, 2, . . . and P, and P is an integer.

The device may be a base station, or may be a terminal.

One embodiment provides a storage medium. Optionally, the storage medium may be configured to store program codes for executing the steps of the method in any one of embodiments described above.

Optionally, in this embodiment, the storage medium may, but is not limited to, include a USB disk, an ROM, an RAM, a mobile hard disk, a magnetic disk, an optical disk or another medium capable of storing program codes.

One embodiment provides a method for mapping a channel resource unit. Since reference signals in this embodiment are configured for assisting the demodulation of data or control signals in channel resource units, the manner for mapping reference signal, to a large extent, relies on a manner for mapping a time-frequency resource of a channel resource unit. This embodiment provides a manner for mapping a channel resource unit.

For a mobile communication system based on OFDM multiple access technology, transmission resources dimensions include two dimensions, a time domain and a frequency domain, or more dimensions. The smallest resource unit of the OFDM system is a resource element (RE) formed by a subcarrier and an OFDM symbol. The OFDM symbol may be a single-carrier frequency-division multiple access (SC-FDMA) symbol based on an OFDM deformed waveform.

A physical resource block (PRB) includes multiple subcarriers. For example, in each PRB, the number of subcarriers is 12. The PRB in the present disclosure merely represents the concept of one frequency domain. A channel resource unit includes multiple PRBs in the frequency domain. For example, in the frequency domain, a channel resource unit includes four PRBs or one PRB (at this time, one channel resource unit is equivalent to one PRB in the frequency domain). The channel resource unit may include one or more symbols in the time domain. For example, in the time domain, the channel resource unit is provided with one or two symbols.

The channel resource unit may be configured for transmitting physical downlink shared channel (PDSCH) data, or may be configured for transmitting control signals. When the channel resource unit is configured for transmitting the control signals, the channel resource unit is also called control channel element (CCE). The embodiments of the present disclosure uniformly use the CCE for transmitting control signals as a shorten form of the channel resource unit, but the channel resource unit includes control signals.

The aggregation of the channel resource units related to data signals may form a data channel, such as the PDSCH. The aggregation of the channel resource units related to control signals may form a control channel. Since a terminal may blindly detect the control channel, the control channel is a candidate for the terminal, and there are more than one candidate sets.

From the perspective of the terminal, aggregated control channel is also called control channel candidate set. In a corresponding resource, a position and a density for mapping the reference signals for the demodulation are related to frequency domain selective, time domain selective, Doppler shift and other wireless channel situations. In the frequency domain, part of subcarriers in each PRB may configure reference signals to meet requirements of the frequency domain selective and the Doppler shift. In the time domain, part of symbols may also configure the reference signals to meet requirements of the time domain selective. The combination of the mapping of the reference signals in both frequency domain and time domain forms the mapping position and density of the reference signals.

In one embodiment, using the control signals as an example, the CCEs of a physical downlink control channel (PDCCH) in the LTE are numbered based on numbers of OFDM symbols in a downlink control region. Common search space and UE-specific search space are defined according to available CCEs. In a new radio (NR), due to the introduction of beams, different beams may be used between each symbol or between each of multiple symbols, so that the CCEs cannot continuously use the numbers of the OFDM symbols. The OFDM symbols may be grouped into subsets, and control symbols in different subsets work under different beams.

In one embodiment, the CCEs are numbered based on the OFDM symbol subsets, and the common search space and the UE-specific search space are defined according to such CCEs. For one user, it is possible to use the CCEs across subsets.

Figure 7:
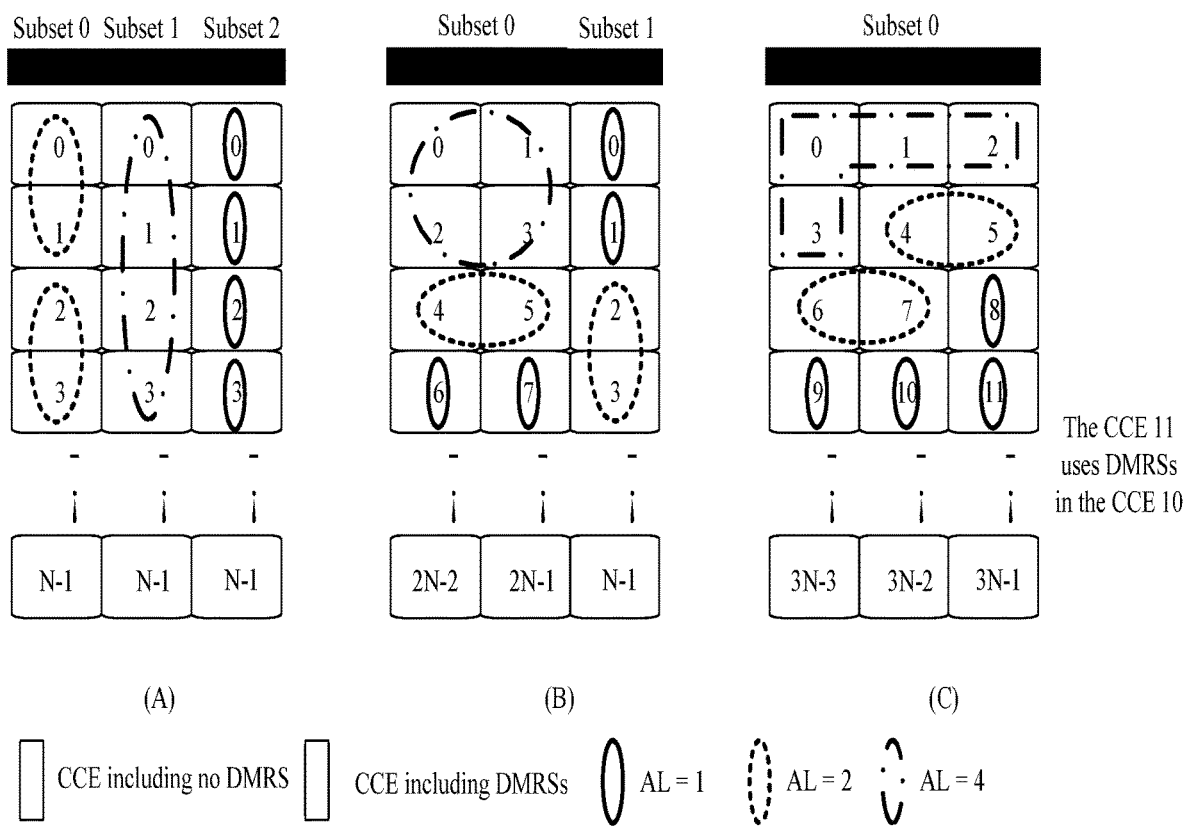
FIG. 7 is a schematic diagram illustrating a method for mapping a channel resource unit according to an embodiment of the present disclosure.

FIG. 7 is a schematic diagram illustrating a method for mapping a channel resource unit according to an embodiment of the present disclosure. As shown in FIG. 7, there are three different subset partitioning manners, respectively A, B and C. In the subset partitioning manner A, three symbols are respectively partitioned into three subsets: subset 0, subset 1 and subset 2. In the subset 0, four visible CCEs (that is, CCE 0, CCE 1, CCE 2 and CCE 3) are aggregated in a manner with an aggregation level of 2. That is, the CCE 0 and the CCE 1 are aggregated as one control channel, and the CCE 2 and the CCE 3 are aggregated as another control channel. In the subset 1, four visible CCEs are aggregated in a manner with the aggregation level of 4. That is, the CCE 0, the CCE 1, the CCE 2 and the CCE 3 are aggregated as one control channel. In the subset 2, the aggregation level is 1. That is, the CCE 0, the CCE, the CCE 2 and the CCE 3 are respectively aggregated as a control channel.

In the subset partitioning manner B, first two symbols are one subset, and the last one symbol is another subset. In the subset 0, the CCEs may be aggregated across symbols, such as the aggregations in dot-dash circles in the manner B. In the subset partitioning manner C, three symbols are in one subset, and the CCEs may be aggregated across more symbols. For example, in the manner C, the aggregations in dot-dash circles are performed across the three symbols.

In one embodiment, characteristics of a physical radio channel are analyzed. In the time domain, an ideal demodulation effect can be achieved even if not all of the multiple OFDM symbols map the reference signals. For the multiple PRBs in the CCEs, each PRB may configure the reference signals.

In one embodiment, in order to save the use of the reference signals, the N channel resource units used by the physical channel may be mapped in a time domain preference manner. That is, within the region formed by multiple OFDM symbols, channel resource units on different OFDM symbols are first selected, and channel resource units in different frequency domain resources are second selected. For example, the aggregation manner of the CCE 0, the CCE 1, the CCE 2 and the CCE 3 in the subset partitioning manner in FIG. 7 is the mapping manner described above. The region formed by one or more OFDM symbols may be a whole region of the control channel, or may be part of the region of the control channel.

One embodiment provides a method for mapping and sending a reference signal. On the basis of the mapping manner in the embodiment shown in FIG. 7, the N channel resource units used by the physical channel are mapped in the time domain preference manner, and a mapping scheme related to the DMRS is designed.

A sending end (such as a base station) determines, according to positions of N channel resource units (such as control channel units CCEs) used by a physical channel, R channel resource units for sending the reference signals from the N channel resource units, where $0 \leq R < N$. The sending end may send the reference signals in the R channel resource units which can map the reference signals. The N channel resource units may also carry channel loads, such as the data and the control signals. The N channel resource units include F different frequency domain positions. Each frequency domain position includes $N(f)$ channel resource units, where $f=0, 1, \ldots$ and $F-1$. The $N(f)$ channel resource units include $R(f)$ channel resource units, where $0 \leq R(f) \leq N(f)$. In one embodiment, $R(f)=1$. In the $N(f)$ channel resource units in each frequency domain position, the reference signals are sent in a channel resource unit having the front time domain position. In one embodiment, $R(f)=0$. When $R(f)=0$, the reference signals are sent in channel resource units whose frequency domain positions are the same as the frequency domain positions of the $N(f)$ channel resource units and which do not belong to the N channel resource units. The channel resource units sending the reference signals are located in the front time domain resource of the physical channel resource region. Whether $R(f)$ is 0 or 1 may be indicted to a corresponding terminal through signaling.

When the reference signals are sent in one determined channel resource unit, a first OFDM symbol in this channel resource unit may be selected to send the reference signals. As described in the embodiment shown in FIG. 7, the channel resource unit may include one, two or more OFDM symbols.

In one embodiment, in the frequency domain within the determined channel resource unit which needs to send the reference signals, each PRB includes multiple REs for mapping the reference signals. For example, two or three REs are configured for mapping the reference signals and are provided to a group of terminals with the same attributes or to one user for the demodulation. When $R(f)=0$, more REs may be adopted in this channel resource unit. For example, four or six REs are configured for assisting the demodulation of multiple groups of terminals or multiple terminals.

Figure 8:
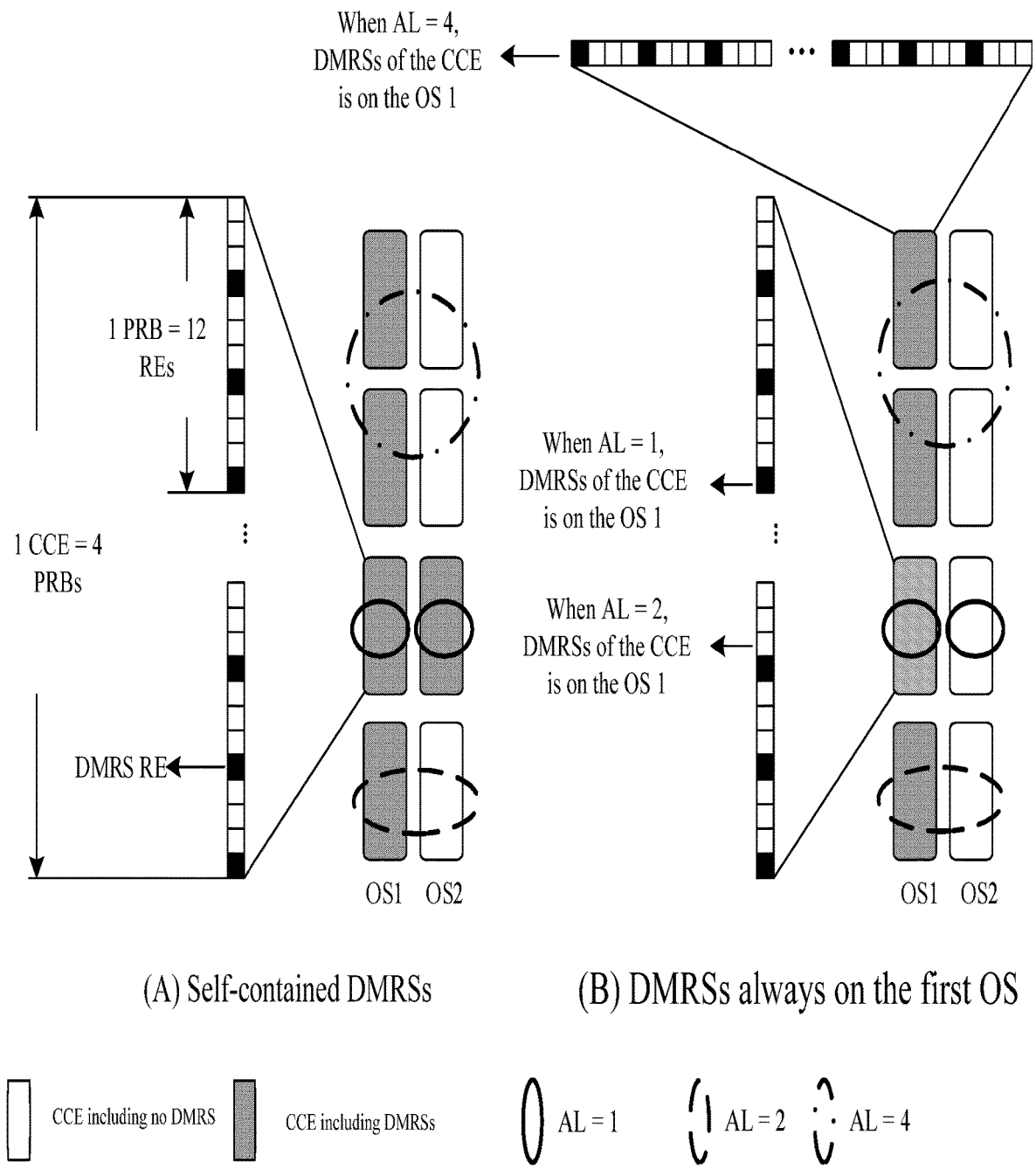
FIG. 8 is a schematic diagram illustrating a method for mapping and sending a reference signal according to an embodiment of the present disclosure.

FIG. 8 is a schematic diagram illustrating a method for mapping and sending a reference signal according to an embodiment of the present disclosure. As shown in FIG. 8, there are two categories of manners for mapping demodulation reference signals (DMRSs). One is self-contained reference signal manner, and the other is a manner using the first symbol to map the reference signals.

For the self-contained reference signal manner, as shown in a manner A in FIG. 8, each control channel candidate set may has its own reference signals. The dot-dash circle is a control channel candidate set aggregated by four CCEs with the aggregation level (AL) of 4. Two symbols are in the time domain, two PRBs are in the frequency domain, and the reference signals are only mapped and sent in the two PRBs of the first symbol. The dash circle is a control channel candidate set aggregated by two CCEs with the AL of 2. Two symbols are in the time domain, one PRB is in the frequency domain, and the reference signals are only mapped and sent in the one PRB of the first symbol. The full-line circles are control channel candidate sets aggregated by one CCE with the AL of 1. One symbol is in the time domain, one PRB is in the frequency domain, and at this time, the reference signals has no other choice but are only mapped and sent in the one PRB of this symbol. Two control channel candidate sets represented in dark respectively map and send their own reference signals.

For the manner using the first symbol to map the reference signals, as shown in the manner B in FIG. 8, regardless of which OFDM symbol the CCEs in the control channel candidate sets are on, the reference signals are always sent on the first OFDM symbol. In this example, the control channel candidate sets may be the same as that of the subset partitioning manner A in FIG. 8, but the aggregated control channel candidate set on the second symbol does not contain its own reference signals. The reference signals of this control channel candidate set are mapped and sent on the first symbol, that is, REs (REs with dot-like background) after the first symbol is amplified are provided to the reference signals demodulated by the second symbol.

As described previously, whether R(f) is 0 or 1 may be indicated to the corresponding terminal through the signaling. When R(f)=1, the self-contained reference signal manner is adopted, that is the subset partitioning manner A in FIG. 8. When R(f)=0, the reference signals placed in the channel resource units of another control channel candidate set are adopted, that is the subset partitioning manner B in FIG. 8.

One embodiment provides a manner for mapping and sending a channel resource unit with small overhead.

As shown in the manner A in FIG. 8, the control channel candidate set represented by the full-line circle of the second symbol has self-contained reference signals. As shown in the manner B in FIG. 8, the control channel candidate set represented by the full-line circle of the second symbol may map and send its reference signals on the first symbol to reduce corresponding overhead.

Figure 9:
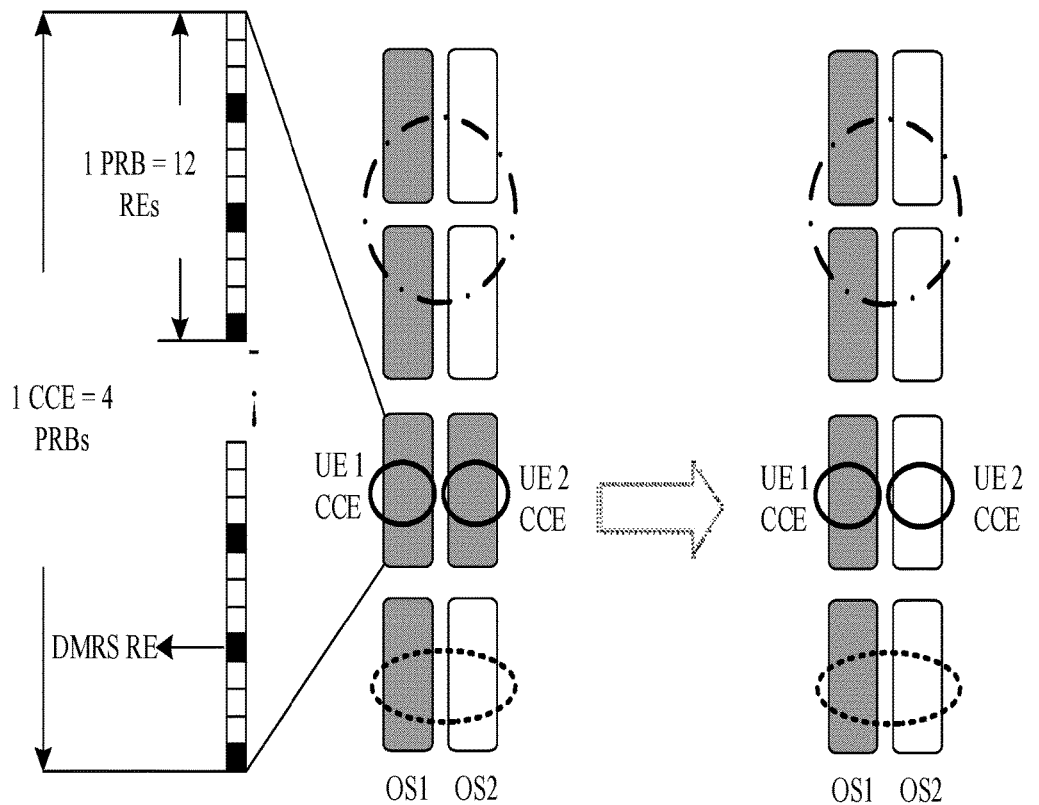
FIG. 9 is a schematic diagram illustrating a method for mapping and sending a DMRS according to an embodiment of the present disclosure.
Figure 9:

In one manner, the control channel candidate set represented by the full-line circle of the second symbol uses the reference signals at the same frequency positions as in the first symbol. The reference signals of the first symbol are shared with the second symbol for the demodulation, thereby saving the overhead. This manner may be notified to the terminal in a predefined manner or through the signaling. FIG. 9 is a schematic diagram of a method for mapping and sending a DMRS according to an embodiment of the present disclosure. As shown in FIG. 9, reference signals in the CCEs of a UE 1 are shared with the CCEs of a UE 2, so that the reference signal overhead of both the UE 1 and the UE 2 is the same as the reference signal overhead of the UE 1. The premise of this processing may be that these two UEs have very similar channel conditions, such as beams with the same direction.

One embodiment provides a computer-readable storage medium configured to store computer-executable instructions for executing the method in any one of embodiments. Each of modules or steps described above may be implemented by a general-purpose computing device. They may be concentrated on a single computing device or distributed on a network formed by multiple computing devices. Optionally, they may be implemented by program codes executable by the computing devices, so that they may be stored in a storage device and executable by the computing devices. In some circumstances, the illustrated or described steps may be executed in sequences different from those described herein, or they may be made into various integrated circuit modules, or each module or step therein may be made into a single integrated circuit module.

INDUSTRIAL APPLICABILITY

A method and apparatus for determining a resource for a reference signal and a device may solve the problem of excessive reference signal overhead, and improve the use efficiency of system resources.

What is claimed is:

1. A resource determination method, comprising:
    selecting, by a wireless communication node from a region including a plurality of orthogonal frequency-division multiplexing (OFDM) symbols, a plurality of channel resource units using a time-first manner, wherein the time-first manner includes first selecting a first subset of channel resource units from different OFDM symbols associated with a first frequency-domain position of a sequence of frequency-domain positions of the region and then selecting a second subset of channel resource units from different OFDM symbols associated with a second frequency-domain position of the sequence of frequency-domain positions, wherein the second frequency-domain position is subsequent to the first frequency-domain position in the sequence of frequency-domain positions;
    determining, by the wireless communication node, a number of channel resource units of the plurality of channel resource units; and
    sending, by the wireless communication node, reference signals in the number of channel resource units.

2. A wireless communication node, comprising:
    a processor; and
    a memory, wherein the processor is configured to read code from the memory to:
        select, from a region including a plurality of orthogonal frequency-division multiplexing (OFDM) symbols, a plurality of channel resource units using a time-first manner, wherein in selecting the plurality of channel resource units using the time-first manner, the processor is configured to first select a first subset of channel resource units from different OFDM symbols associated with a first frequency-domain position of a sequence of frequency-domain positions of the region and then select a second subset of channel resource units from different OFDM symbols associated with a second frequency-domain position of the sequence of frequency-domain positions, wherein the second frequency-domain position is subsequent to the first frequency-domain position in the sequence of frequency-domain positions;

determine a number of channel resource units of the plurality of channel resource units; and send reference signals in the number of channel resource units.

3. A resource determination method, comprising:

selecting, by a mobile terminal from a region including a plurality of orthogonal frequency-division multiplexing (OFDM) symbols, a plurality of channel resource units using a time-first manner, wherein the time-first manner includes first selecting a first subset of channel resource units from different OFDM symbols associated with a first frequency-domain position of a sequence of frequency-domain positions of the region and then selecting a second subset of channel resource units from different OFDM symbols associated with a second frequency-domain position of the sequence of frequency-domain positions, wherein the second frequency-domain position is subsequent to the first frequency-domain position in the sequence of frequency-domain positions;

determining, by the mobile terminal, a number of channel resource units of the plurality of channel resource units; and receiving, by the mobile terminal, reference signals in the number of channel resource units.

4. A mobile terminal, comprising:

a processor; and a memory, wherein the processor is configured to read code from the memory to:

select, from a region including a plurality of orthogonal frequency-division multiplexing (OFDM) symbols, a plurality of channel resource units using a time-first manner, wherein in selecting the plurality of channel resource units using the time-first manner, the processor is configured to first select a first subset of channel resource units from different OFDM symbols associated with a first frequency-domain position of a sequence of frequency-domain positions of the region and then select a second subset of channel resource units from different OFDM symbols associated with a second frequency-domain position of the sequence of frequency-domain positions, wherein the second frequency-domain position is subsequent to the first frequency-domain position in the sequence of frequency-domain positions;

determine a number of channel resource units of the plurality of channel resource units; and receive reference signals in the number of channel resource units.

* * * * *